(12) United States Patent
Ehlers et al.

(10) Patent No.: US 8,672,266 B2
(45) Date of Patent: Mar. 18, 2014

(54) OVERHEAD BIN FOR USE ON BOTH SIDES IN AN AIRCRAFT

(75) Inventors: Bernd Ehlers, Hamburg (DE); Mark Herzog, Barsbuettel (DE)

(73) Assignee: Airbus Operations GmbH (DE)

( * ) Notice: Subject to any disclaimer, the term of this patent is extended or adjusted under 35 U.S.C. 154(b) by 214 days.

(21) Appl. No.: 12/363,071

(22) Filed: Jan. 30, 2009

(65) Prior Publication Data

US 2009/0194635 A1 Aug. 6, 2009

Related U.S. Application Data

(60) Provisional application No. 61/063,029, filed on Jan. 31, 2008.

(30) Foreign Application Priority Data

Jan. 31, 2008 (DE) .......................... 10 2008 006 949

(51) Int. Cl.
*B64D 11/00* (2006.01)

(52) U.S. Cl.
USPC ....................................... 244/118.5; 312/283

(58) Field of Classification Search
USPC ............ 244/118.5, 118.1; 312/283, 285, 286, 312/287
See application file for complete search history.

(56) References Cited

U.S. PATENT DOCUMENTS

| 3,598,273 | A  | * | 8/1971  | Rau et al. ........................ 220/1.5 |
| 4,951,560 | A  |   | 8/1990  | Setan |
| 5,549,258 | A  | * | 8/1996  | Hart et al. .................. 244/118.1 |
| 5,820,076 | A  |   | 10/1998 | Schumacher et al. |
| 6,290,175 | B1 | * | 9/2001  | Hart et al. .................. 244/118.5 |
| 6,318,671 | B1 | * | 11/2001 | Schumacher et al. ..... 244/118.5 |
| 2007/0152480 | A1 | * | 7/2007 | Muin et al. ............... 297/188.08 |
| 2007/0164155 | A1 |   | 7/2007 | Muin et al. |

FOREIGN PATENT DOCUMENTS

| DE | 4228260 | 3/1994 |
| DE | 19540929 | 5/1997 |
| DE | 102006048998 | 7/2007 |
| EP | 0225812 | 6/1987 |
| FR | 2879087 | 6/2006 |

* cited by examiner

*Primary Examiner* — Robert Canfield
*Assistant Examiner* — Jessie Fonseca
(74) *Attorney, Agent, or Firm* — Lerner, David, Littenberg, Krumholz & Mentlik, LLP (57) ABSTRACT

An overhead bin for use on both sides in a passenger cabin of an aircraft, includes a first baggage compartment and a second baggage compartment, a first opening and a second opening for loading items into the first baggage compartment and into the second baggage compartment, and a partition for dividing the first baggage compartment from the second baggage compartment. The first baggage compartment and the second baggage compartment differ from each other in their shape and/or alignment. With several overhead bins, the alignment of a larger and a smaller baggage bin can alternate so that adequate bin space for stowing hand baggage is available to passengers in the center seats.

13 Claims, 8 Drawing Sheets

FIG. 8

OVERHEAD BIN FOR USE ON BOTH SIDES IN AN AIRCRAFT

CROSS-REFERENCE TO RELATED APPLICATIONS

This application claims the benefit of the filing date of U.S. Provisional Patent Application No. 61/063,029 filed Jan. 31, 2008, the disclosure of which is hereby incorporated herein by reference.

BACKGROUND OF THE INVENTION

The invention relates to an overhead bin for use on both sides in an aircraft.

Such overhead bins for use on both sides have been in widespread use for a long time. In particular, such bins are located in passenger cabins comprising two aisles and are arranged along the longitudinal axis of the fuselage above passenger seats located in the centre of the cabin cross section (therefore hereinafter also referred to as "centre overhead bins"). They are used to accommodate items of baggage of passengers who have the centre seats in the cabin allocated to them. The overhead bins are tied to the seat configuration in the centre region, and if at all possible should not protrude into the aisles, where they would become a hindrance to passengers. If a configuration comprising only one seat in the centre region is to be implemented, this may result in very narrow overhead bins in the centre of the cabin.

The use on both sides of a centre bin requires two baggage loading openings, as well as a partition in the interior of the overhead bin so that items of baggage placed from one end do not force out any items of baggage that have been put in place from the opposite end. A conventional centre bin is divided such that it is essentially symmetrical to its longitudinal axis, which in the installed state extends along the centre line of the passenger cabin. This means that from both ends the available loading volume of a divided centre bin is identical. However, it is only in the rarest of cases that the passengers on board all have items of hand baggage of identical size, so that both large and small items of hand baggage have to be stowed in the centre overhead bins. If the centre overhead bins are relatively small, passengers from the centre seats preferably place their items of hand baggage in lateral overhead bins situated on the outside, which overhead bins provide significantly more space than narrow centre bins. This is not desirable, not only so as to avoid overloading the lateral overhead bins, but also so that adequate stowage room is available for the baggage of the laterally seated passengers. However, conventional centre bins cannot provide flexible use for items of baggage of different sizes.

BRIEF SUMMARY OF THE INVENTION

It may be an object of the invention to propose an overhead bin for use on both sides, which overhead bin may provide a maximum of flexibility so that items of baggage of various sizes may be stowed in the bin from both sides so that there is no longer any need for passengers in a passenger cabin to resort to using overhead bins that are situated on the outside and that can only be accessed from one end.

This object may be met by an overhead bin according to claim 1. Advantageous embodiments are shown in the subclaims.

An overhead bin according to the invention may comprises two baggage compartments as well as a partition that separates the baggage compartments. According to the invention, the division of the baggage compartments may not be symmetrical so that the baggage compartments may comprise various shapes and alignments. In a first preferred embodiment this means that a vertically arranged partition in longitudinal direction may not be arranged in the centre between the openings within the overhead bin, but instead may be eccentrically arranged. The overhead bin according to the invention may thus provide two baggage compartments, arranged one beside the other, of different volumes. Such an overhead bin according to the invention is associated with an advantage in cases where several overhead bins according to the invention are arranged adjacent to one another in longitudinal direction of the cabin so that their partitions are alternately situated on the left-hand side and on the right-hand side of the overhead bins, so that starting from a first aisle and moving in longitudinal direction of the aircraft, large and small baggage compartments that are open towards the first aisle alternate in the centre bins that are adjacent to one another.

In a second preferred exemplary embodiment the partition may be arranged horizontally so that two baggage compartments that are situated one on top of the other and comprise different volumes may be provided within the overhead bin according to the invention, which baggage compartments may be closed at one end and therefore may only be accessed by way of one opening. According to the invention, the baggage compartments, situated one on top of the other, may be accessible from opposite opening sides so that one end of the overhead bin comprises a larger baggage compartment than the opposite side of the overhead bin. As a result of this, too, large and small available baggage compartments in the overhead bins that are arranged side by side may alternate along an aisle in the aircraft.

As a result of this, in each case only from one aisle may a large item of baggage be placed in a respective centre bin, while from the opposite aisle there may only be space for a smaller item of baggage in the same centre bin. For example, a trolley as a large item of baggage might be placed in a larger baggage compartment, while on the other side sufficient space would remain for an attache case, a handbag or the like. However, as a result of the alternating arrangement there may always be a bin nearby that provides adequate space for the particular item of hand baggage to be accommodated. Consequently, an arrangement of centre bins may not be limited to a relatively small maximum size of items of baggage, but instead on both ends may provide adequate space for smaller and larger items of baggage so that there may no longer be any need for passengers to resort to using overhead bins that are situated on the outside in the passenger cabin.

Furthermore, the object of the invention may be met by an arrangement of overhead bins according to the invention, the use of an overhead bin according to the invention, and an aircraft with an arrangement of overhead bins according to the invention.

BRIEF DESCRIPTION OF THE DRAWINGS

Below, the invention is explained in more detail with reference to the figures. Identical items in the figures have the same reference characters. The following are shown.

DETAILED DESCRIPTION

Figure 1:
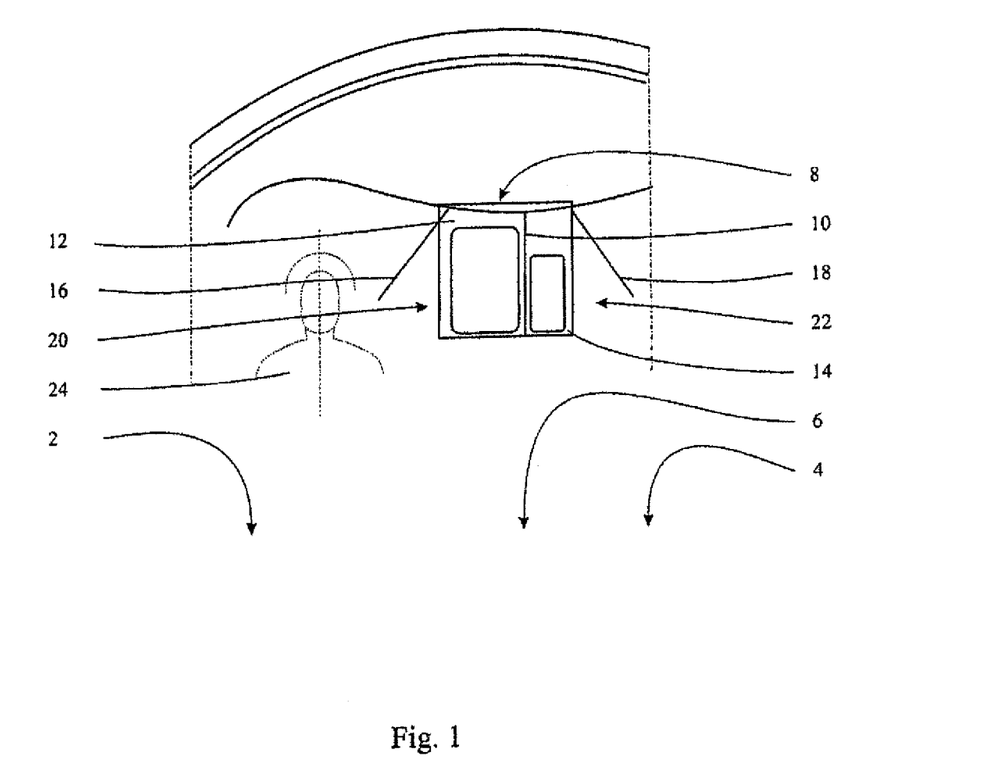
FIG. 1: a cross section of an aircraft cabin with overhead bins according to the invention in cross section.

FIG. 1 shows an upper section of the cross section of a passenger cabin of an aircraft, which passenger cabin comprises two parallel aisles 2 and 4 that extend in longitudinal direction of the aircraft. Each seat row in the passenger cabin comprises three seat groups, in each case separated by the aisles 2 and 4. Above the centre seat groups 6, along the aircraft fuselage, centre bins 8 are arranged that are used to stow baggage of passengers who have the centre seat groups 6 allocated to them.

The centre bin 8, which is shown in a section view in FIG. 1, comprises a partition 10 that separates two baggage compartments 12 and 14 arranged on two opposite ends of the centre bin 8. On both ends the overhead bin 8 comprises loading openings 20 and 22 that can be reached from each aisle 2 and 4 and that can be closed by hinged lids 16 and 18. In the overhead bin 8 according to the invention the partition 10 extends so as to be essentially parallel to the loading openings 20 and 22 and is arranged at a distance from a plane that extends in the centre between the loading openings 20 and 22. This means that the interior of the overhead bin 8 is not symmetrical in design and that, for example, a relatively large baggage compartment 12 is arranged on the left-hand side of the overhead bin 8, while on the right-hand side of the overhead bin 8 a smaller baggage compartment 14 is arranged. As an example the diagram shows that a relatively large trolley is stowed in the larger baggage compartment 12, while the right-hand baggage compartment 14 only provides space for an attache case, a notebook bag, a handbag or the like. It is particularly advantageous if the interior dimensions of the first baggage compartment 12 are such that they accommodate items of hand baggage with maximum dimensions according to national and/or international guidelines for cabin baggage/hand luggage, for example the corresponding IATA guideline. As a result of the different sizes of the baggage compartments 12 and 14, the overhead bin 8 according to the invention can be designed such that it does not project into the aisles 2 and 4, to prevent persons 24 in the aisles bumping against it or having their freedom of movement restricted by it.

Figure 5:
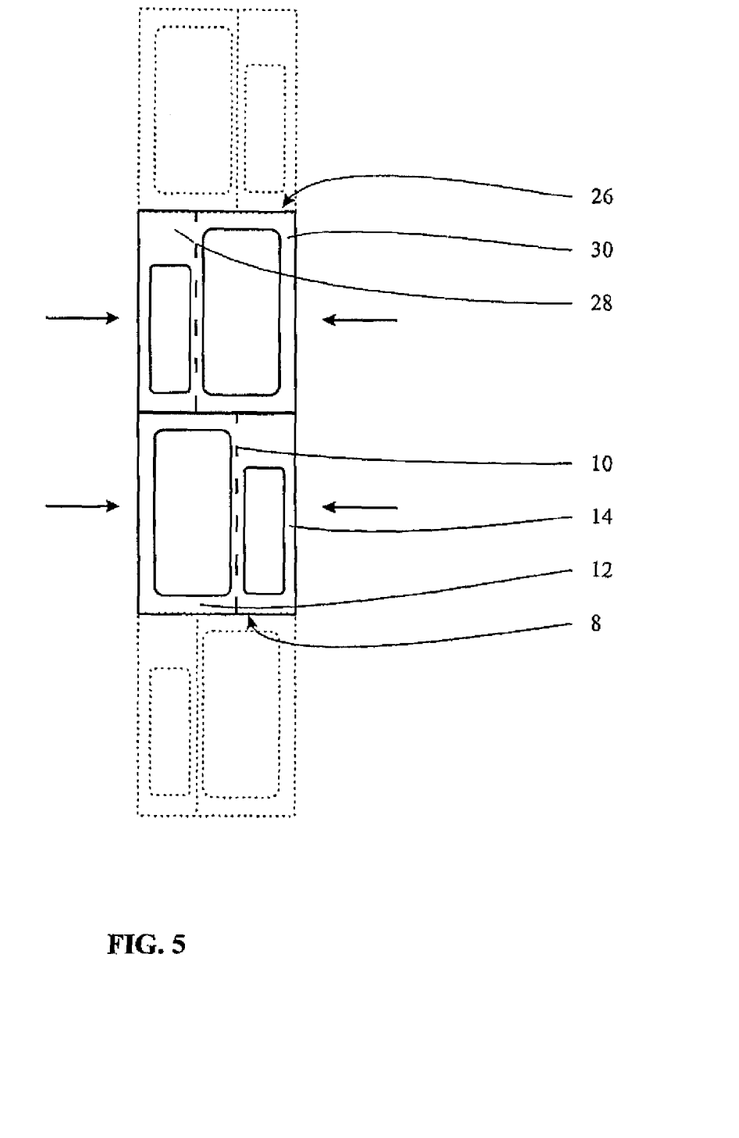
FIG. 5 a top view of a passenger cabin with successive overhead bins according to the invention in a longitudinal section.

It is not necessary to design the partition 10 as a fixed wall; instead, mesh-like or net-like structures for separating the baggage compartments 12 and 14 are imaginable, as shown in FIG. 5. Furthermore, it can also be advantageous to design the partition so that it is variable and can easily be adapted to various load situations. In addition a partition 10 may also comprise recesses, preferably situated on the ends of the overhead bins, in order to accommodate wheels or rollers of items of baggage. For example, many commercially available trolleys comprise rigidly held rollers that cannot be retracted into the trolley after use but instead permanently form a type of projection. This projection, formed by the rollers, when positioned in corresponding recesses in a partition wall, may reduce the space required by a trolley in a baggage compartment 12 or 14, and may thus further optimise the use of space in the overhead bins according to the invention.

Figure 4:
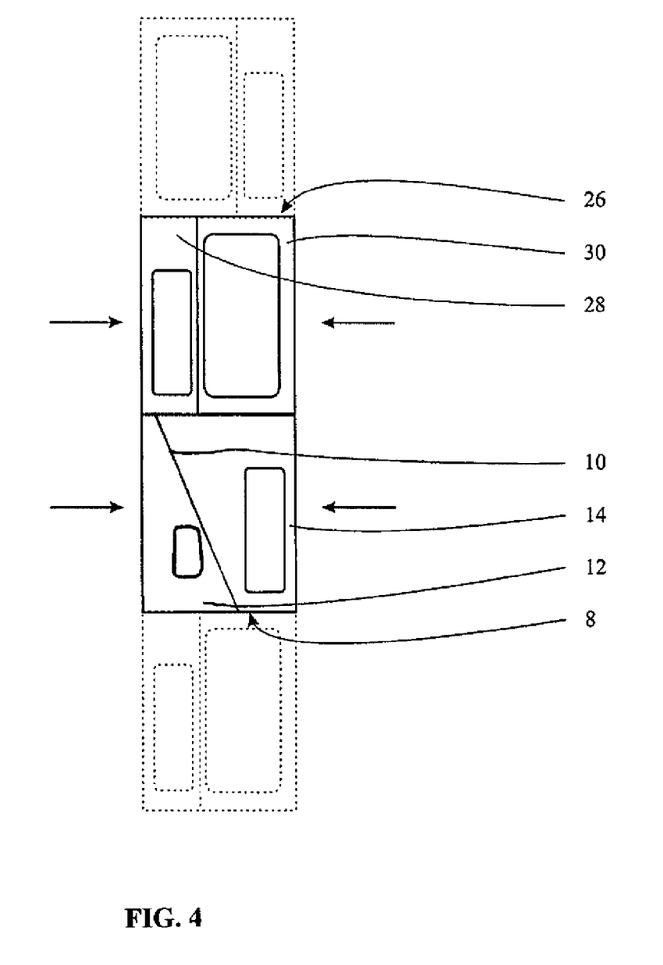
FIG. 4 a top view of a passenger cabin with successive overhead bins according to the invention in a longitudinal section.

It should be pointed out that overhead bins 8 according to the invention that comprise two separate overhead bins that are attached to one another can be advantageous. With a correspondingly wide seat unit in the centre of the fuselage this would also make it possible to combine overhead bins that are already available on the market and that comprise different depths. Furthermore, overhead bins 8 according to the invention which do not have a second baggage compartment 14 can be advantageous, i.e. the partition 10 closes off the entire overhead bin 8. Such overhead bins 8, arranged one beside the other, according to the invention can also be aligned so as to alternately open towards two opposite ends. Furthermore, it is not necessary to align a partition 10 parallel to the longitudinal direction of the cabin. Instead it can also be advantageous if the partition 10 is aligned diagonally or comprises a single curvature or multiple curvatures, as shown in FIG. 4.

Figure 2:
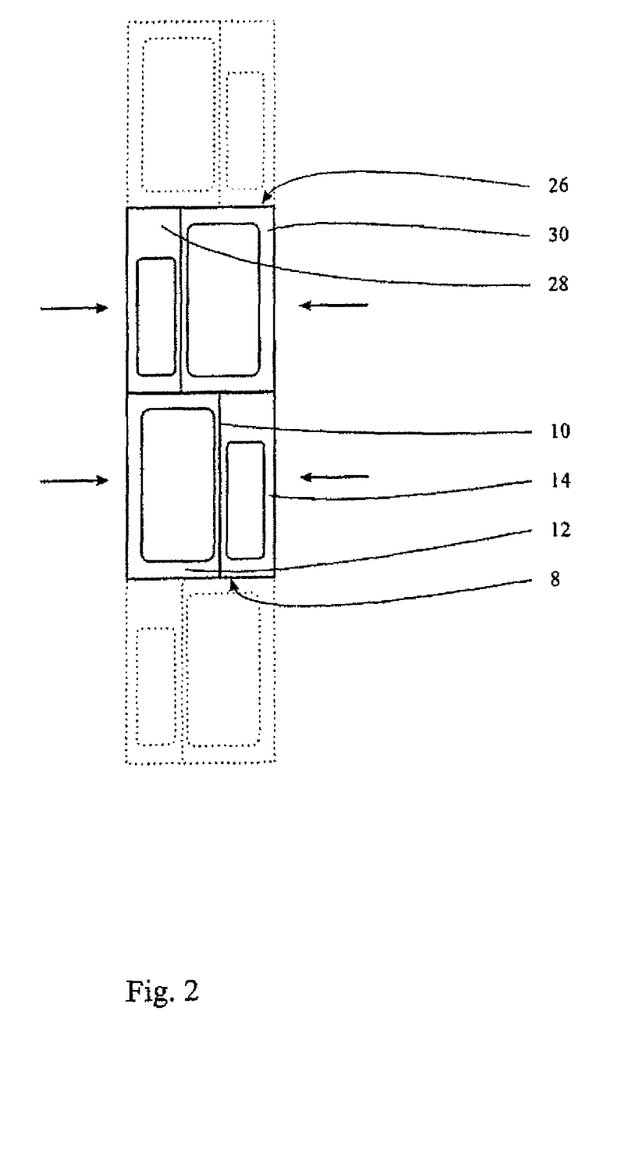
FIG. 2 a top view of a passenger cabin with successive overhead bins according to the invention in longitudinal section.

FIG. 2 shows a top view of two adjacent overhead bins 8 and 26. In this arrangement the lower overhead bin 8 in FIG. 2 is identical to the overhead bin 8 of FIG. 1. This means that on its left-hand end the overhead bin 8 comprises a large baggage compartment 12 and on its right-hand end a smaller stowage space 14, with the two stowage spaces being separated by a partition 10. The overhead bin 26 is adjacent in longitudinal direction (for example directed to the front of the fuselage) to the first overhead bin 8, and on its left-hand end comprises a smaller baggage compartment 28, while on its right-hand end it comprises a larger baggage compartment 30 so that it is designed so as to be precisely mirror-inverted when compared to overhead bin 8. Consequently, persons on the left-hand aisle 2 can place a relatively large item of baggage in the rear overhead bin 8, but only a smaller item of baggage in the adjacent overhead bin 26. Since not every passenger has a large item of baggage, a passenger who has one of the centre seats allocated to him or her will, for example, select one of the two compartments 8 or 26 in which to stow their item of baggage. As a result of the expected statistical distribution of the sizes of items of baggage within the cabin, passengers seated in the centre seats essentially always find adequate space in which to stow their items of baggage without having to resort to using overhead bins that are situated on the outside in the cabin.

The arrangement of the overhead bins 8 and 26 according to the invention alternates, for example, every 1 to 1.5 m (40 to 60 inches). Overall, there is more on-board stowage space for large items of baggage than is the case with conventional centre overhead bins that always provide baggage compartments of the same size. In addition it should be noted that the smaller baggage compartments 14 or 28 are particularly recommended for sensitive items of baggage because there is no danger of further large items of baggage damaging these sensitive items. In addition, as a result of the provision of a greater number of large baggage compartments both the boarding process and the deplaning process are accelerated, because it is no longer necessary to laboriously distribute larger items of baggage to outer overhead bins, and thereafter collect them again.

Figure 3:
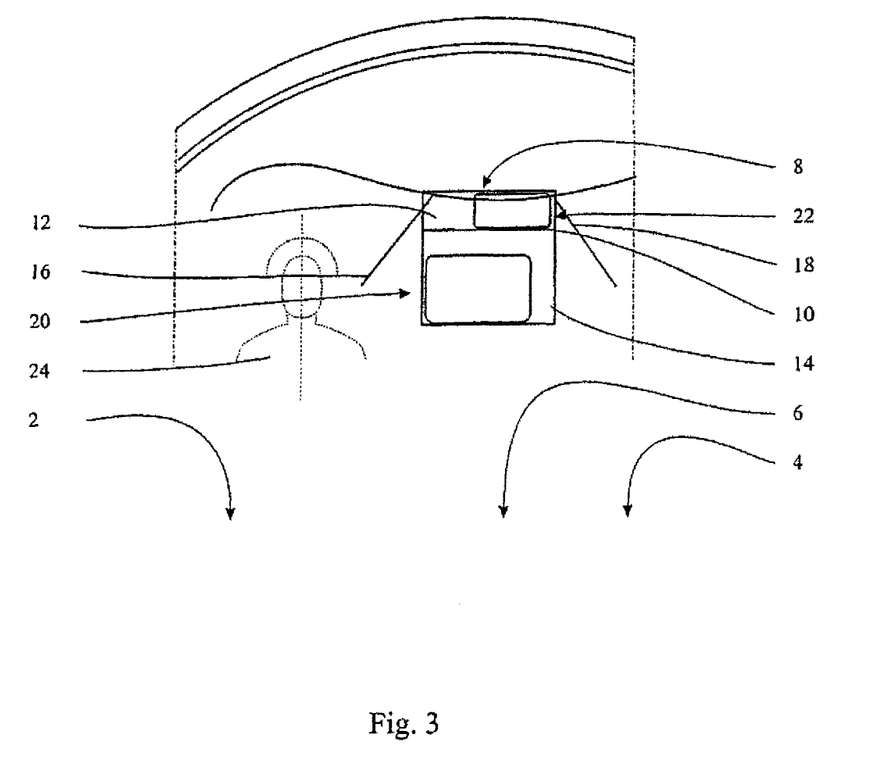
FIG. 3 a cross section of an aircraft cabin with modified overhead bins according to the invention in cross section.

Finally, FIG. 3 shows a modification of the overhead bin 8 according to the invention, in which overhead bin 8 the partition 10 is horizontally aligned. The first baggage compartment 12 is arranged above the second baggage compartment 14 and can be reached through the first loading opening 20. The end of the first baggage compartment 12, which end is opposite the first loading opening 20, is closed. Analogous to this, the second baggage compartment can be reached through the second loading opening 22 and is also closed on the end opposite the loading opening.

Figure 6:
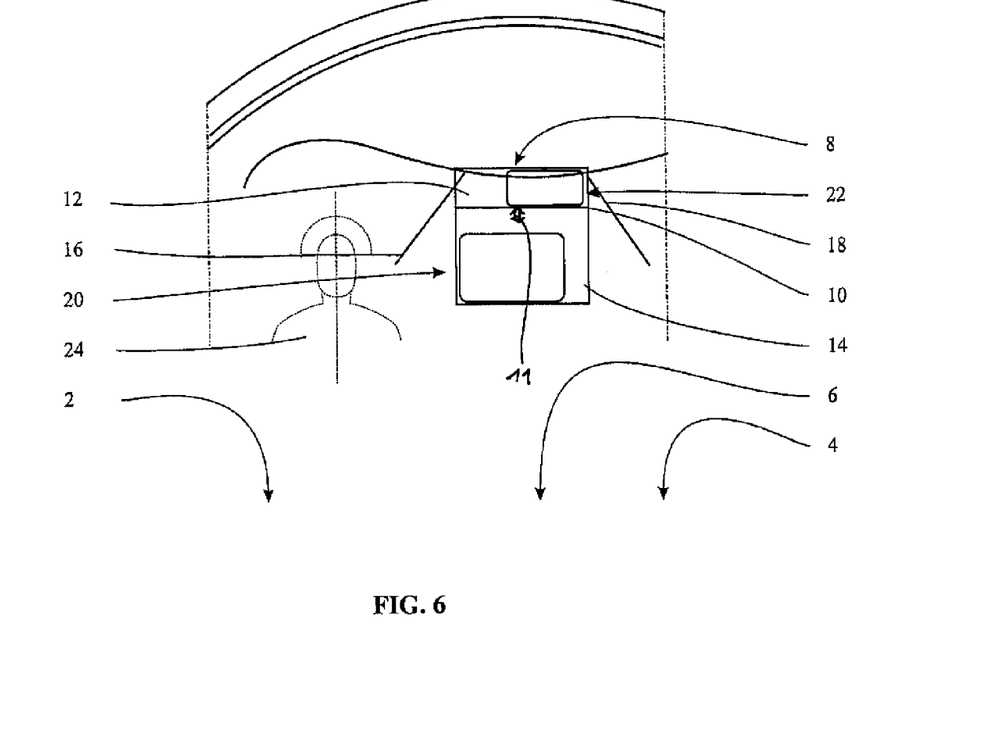
FIG. 6 a cross section of an aircraft cabin with overhead bins according to the invention in cross section.
Figure 7:
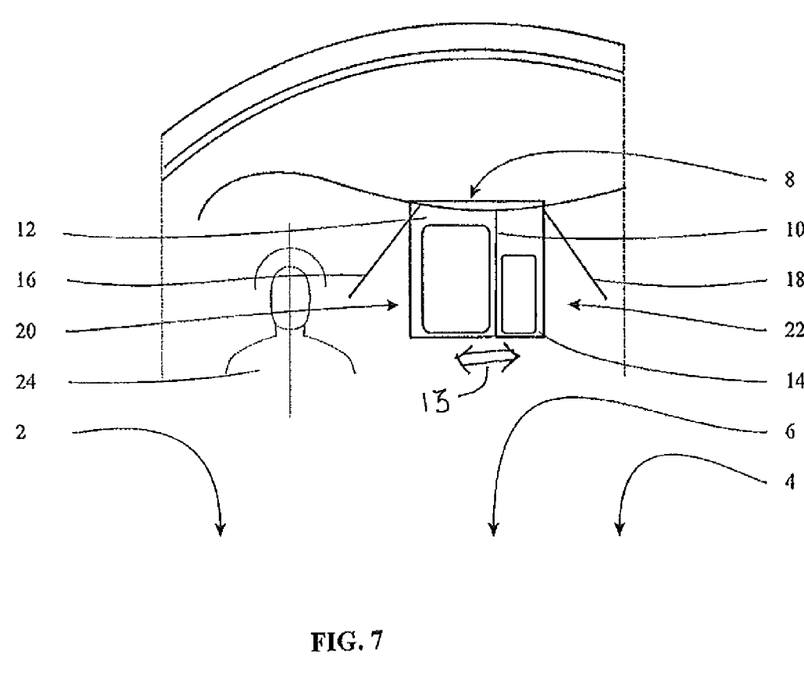
FIG. 7 a cross section of an aircraft cabin with overhead bins according to the invention in cross section.
Figure 8:
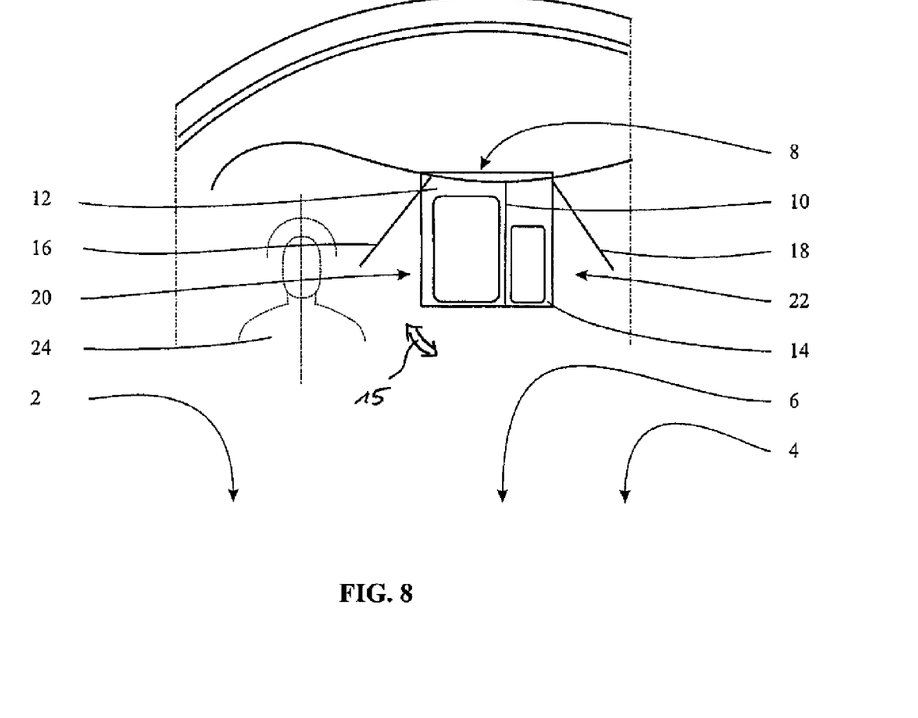
FIG. 8 a cross section of an aircraft cabin with overhead bins according to the invention in cross section.

The partition for altering the first baggage compartment and the second baggage compartment may be at least one of variably affixable 11 (FIG. 6), slidable 13 (FIG. 7), or swivelable 15 (FIG. 8) in the overhead bin.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2: Left-hand aisle in the aircraft cabin
4: Right-hand aisle in the aircraft cabin
6: Centre seat group(s)
8: Overhead bin
10: Partition
12: First baggage compartment
14: Second baggage compartment
16: Hinged lid to the first baggage compartment
18: Hinged lid to the second baggage compartment
20: Loading opening to the first baggage compartment
22: Loading opening to the second baggage compartment
24: Person in the aircraft cabin
26: Further overhead bin
28: Second baggage compartment of the further overhead bin
30: First baggage compartment of the further overhead bin

The invention claimed is:

1. An overhead bin attached to an aircraft for both-sided use in a passenger cabin of the aircraft, comprising:
    first and second sidewalls;
    a first self-contained baggage compartment having a first volume defined between and delimited by the first and second sidewalls;
    a second self-contained baggage compartment having a second volume defined between and delimited by the first and second sidewalls;
    a first opening positioned on a first side of the overhead bin for loading items into the first baggage compartment and defined between and delimited by the first and second sidewalls;
    a second opening positioned on a second side of the overhead bin for loading items into the second baggage compartment and defined between and delimited by the first and second sidewalls; and
    a partition for dividing the first baggage compartment from the second baggage compartment, the partition arranged between the first and second sidewalls;
    wherein the first opening and the second opening are positioned on opposite sides of the partition; and
    wherein the first baggage compartment and the second baggage compartment differ from each other in their volumes and comprise opposite loading directions relative to the overhead bin.

2. The overhead bin of claim 1, wherein the partition extends substantially parallel to, and spaced apart from, a plane arranged vertically in the middle between the first and second openings.

3. The overhead bin of claim 1, wherein the partition extends substantially parallel to, and spaced apart from, a plane arranged horizontally in the middle between the top and the bottom of the overhead bin.

4. The overhead bin of claim 1, wherein the partition extends substantially diagonally to a plane arranged vertically in the middle between the first and second openings.

5. The overhead bin of claim 1, comprising a width that substantially does not exceed the width of a seat unit that is located underneath it in the installed state of the overhead bin.

6. The overhead bin of claim 1, wherein the first volume is substantially twice the second volume.

7. The overhead bin of claim 1, wherein the partition comprises a mesh screen or a net.

8. The overhead bin of claim 1, wherein the partition for altering the first baggage compartment and the second baggage compartment is adapted so as to be at least one of variably affixable, slidable, and swivellable in the overhead bin.

9. The overhead bin of claim 1, wherein the first baggage compartment or the second baggage compartment is adapted to accommodate an item of baggage of a predetermined size.

10. The overhead bin of claim 1, wherein the bin is adapted to arrange two separate overhead bins one next to the other.

11. An arrangement of at least first and second overhead bins for both-sided use in a passenger cabin of an aircraft, the passenger cabin comprises at least one aisle, wherein the first and second bins are located on a cabin ceiling distanced from cabin walls, and wherein the first and second overhead bins each comprise:
    first and second sidewalls;
    a first self-contained baggage compartment having a first shape defined between and delimited by the first and second sidewalls;
    a second self-contained baggage compartment having a second shape defined between and delimited by the first and second sidewalls;
    a first opening for loading items into the first baggage compartment defined between and delimited by the first and second sidewalls; and
    a second opening for loading items into the second baggage compartment defined between and delimited by the first and second sidewalls; and
    a partition for dividing the first baggage compartment from the second baggage compartment, the partition arranged between the first and second sidewalls;
    wherein the first opening and the second opening are positioned on first and second opposite sides of the respective partition and between and delimited by the first and second sidewalls;
    wherein the first shape and the second shape differ from each other, and
    wherein the first and second overhead bins are arranged such that they adjoin each other in a longitudinal direction of the passenger cabin, and
    wherein the first opening of the first overhead bin is adjacent to the second opening of the second overhead bin on the first side and the second opening of the first overhead bin is adjacent to the first opening of the second overhead bin on the second side.

12. An aircraft with an arrangement of at least first and second overhead bins for both-sided use in a passenger cabin of the aircraft, the passenger cabin comprises at least one aisle, and wherein each of the first and second bins comprises:
    first and second sidewalls;
    a first self-contained baggage compartment having a first shape defined between and delimited by the first and second sidewalls;

a second self-contained baggage compartment having a second shape defined between and delimited by the first and second sidewalls;

a first opening for loading items into the first baggage compartment defined between and delimited by the first and second sidewalls; and a second opening for loading items into the second baggage compartment defined between and delimited by the first and second sidewalls; and a partition for dividing the first baggage compartment from the second baggage compartment, the partition arranged between the first and second sidewalls;

wherein the first opening and the second opening are positioned on first and second opposite sides of the respective partition and between and delimited by the first and second sidewalls;

wherein the first shape and the second shape differ from each other, and wherein the first and second overhead bins are arranged such that they adjoin each other in a longitudinal direction of the passenger cabin, and wherein the first opening of the overhead first bin is adjacent to the second opening of the second overhead bin on the first side and the second opening of the first overhead bin is adjacent to the first opening of the second overhead bin on the second side.

13. An overhead bin attached to an aircraft for both-sided use in a passenger cabin of the aircraft, comprising:

first and second sidewalls;

a first baggage compartment defined between and delimited by the first and second sidewalls;

a second baggage compartment defined between and delimited by the first and second sidewalls;

a first opening and a second opening for loading items into the first baggage compartment and into the second baggage compartment, respectively, defined between and delimited by the first and second sidewalls; and a generally planar partition for dividing the first baggage compartment from the second baggage compartment, the partition arranged between the first and second sidewalls;

wherein the first opening and the second opening are positioned on opposite sides of the partition and between and delimited by the first and second sidewalls;

wherein the first baggage compartment and the second baggage compartment differ from each other in their shapes, and wherein the generally planar partition extends between the first and second opening horizontally between the top and the bottom of the overhead bin or vertically between the first and second openings, thereby dividing the overhead bin asymmetrically into the first and second baggage compartments.

* * * * *